United States Patent Office

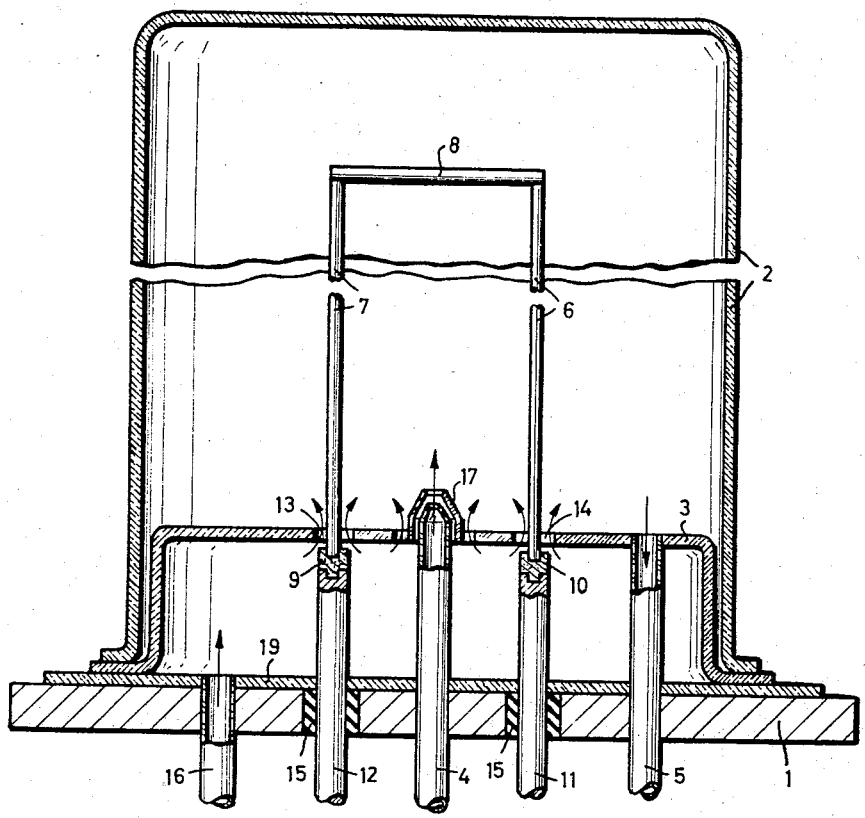
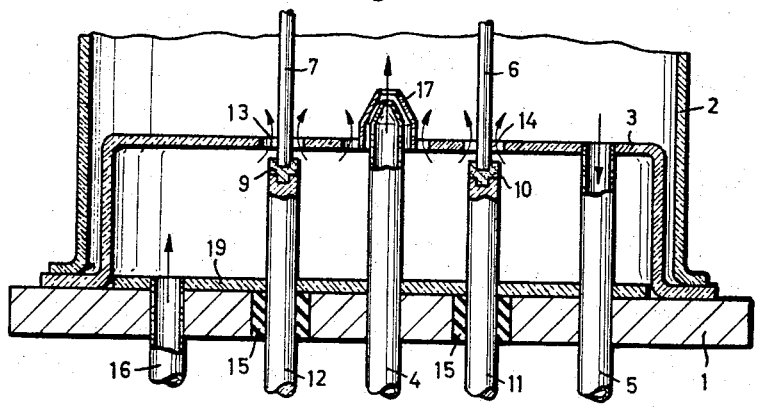

3,358,638
Patented Dec. 19, 1967

3,358,638
APPARATUS FOR THE PYROLYTIC PRODUCTION OF ROD-SHAPED SEMICONDUCTOR BODIES
Theodor Rummel, Munich, Germany, assignor to Siemens & Halske Aktiengesellschaft, Berlin, Germany, a corporation of Germany
Filed Aug. 7, 1963, Ser. No. 300,586
Claims priority, application Germany, Aug. 22, 1962, S 81,031
6 Claims. (Cl. 118—49.5)

My invention relates to apparatus for producing crystalline rods of hyperpure semiconductor substance by thermally dissociating a highly purified gaseous compound of the semiconductor substance and precipitating the dissociation product upon one or more rod-shaped and particularly monocrystalline carriers of the same material that are kept heated to the required reaction temperature.

At the beginning of the precipitation process, an elongated carrier in the shape of a wire or filament, consisting for example of highly pure silicon, is first preheated so as to become sufficiently conductive electrically. The carrier is thereafter further heated by directly passing electric current through it, thus increasing its temperature to the reaction temperature and maintaining it at that temperature for subsequently performing the precipitation process.

In the operation of the equipment used for such processes it has been observed that oily by-products become separated at localities of the reaction vessel that are relatively cool. For example, in the production of silicon from such gaseous compounds as silicon tetrachloride or silicochloroform, it has been found that silane polymers are precipitated in form of an oily product at the relatively cool vessel locations and, if this product is formed in appreciable quantities, explosions may result.

For the purpose of increasing the degree of purity of semiconductor bodies pyrolytically grown in the above-described manner, it has been suggested in the copending application of Heinz Henker, Josef Grabmaier, Theodor Rummel and Hans-Friedrich Quast, Ser. No. 858,223, filed Dec. 8, 1959 and now Patent No. 3,134,695, that the pyrolytic reaction space proper be separated from an antechamber for receiving the precipitated semiconductor material which contains all components of the equipment other than the heated carrier structure. More particularly, the holders and the means for supplying heating current to the carrier structure are thus mounted in the antechamber and separated by a quartz partition from the reaction space proper, and the metallic base plate of the reaction vessel is thus likewise separated from the reaction space by the partition. Since the cover bell and the partition in such an apparatus and consequently all surfaces that border the enclosed reaction space consist of quartz, the ingress of undesired impurities to the growing semiconductor material is prevented, thereby accounting for the improvement in purity of the semiconductor body. At the same time, when the pyrolytic method is performed in apparatus of the aforementioned type, the formation of oily deposits is somewhat lessened because of the quartz partition. This is due to the fact that heat dissipation from the reaction space proper is reduced because of the poor thermal conductance of quartz so that cooling of the vessel wall is prevented or impeded. This leads to a reduction in the quantity of oil that is formed i.e. the precipitation of the explosive oily polymer compounds of the semiconductor substance being produced, such precipitation taking place at temperatures below the approximate limit of about 160° C.

However, various experiments that have been performed in connection with the objective mentioned above of preventing the formation of oily precipitation, have failed to produce desired results. For example, the expedient of keeping all walls of the reaction space in hot condition was found to be successful only if the walls possessed a temperature of close accuracy between 160 and 400° C. At a temperature below 160° C., chlorsilane polymers were formed in the production of silicon by thermal dissociation of a silicon-hydrogen chloride compound, and at temperatures above 400° C. silicon was precipitated on the vessel walls. Major difficulties are moreover encountered in the accurate maintenance of the favorable temperature range which cannot be reliably achieved in most cases.

It is therefore an object of my invention to improve pyrolytic production apparatus of the above-mentioned kind for producing rod-shaped semiconductor bodies while reliably preventing the precipitation of polymer explosive compounds of the semi-conductor substance by greatly facilitating the maintenance of the proper temperature range with a minimum of equipment and personal attention.

It is another object of my invention to prevent the precipitation of detrimental by-products by relatively simple means and to thereby obviate such disadvantages as the obscuring of the vessel portions which must remain transparent in order to permit observation of the progressing reaction, as well as the production of accumulations which are apt to present explosion hazards.

According to my invention I provide an apparatus for producing rod-shaped semiconductor bodies of high purity by pyrolytically dissociating and precipitating the semiconductor substance from a gaseous compound thereof upon a heated carrier of the same material which is partly similar to the above-mentioned apparatus of the copending application in which a space within the reaction vessel is subdivided by a vitreous partition, preferably of quartz, into an upper reaction chamber that substantially contains only a U-shaped carrier for the precipitate, and a lower antechamber containing the other components of the equipment, particularly the means for holding the carrier and supplying electric current thereto, as well as the means for passing gas into and out of the reaction chamber proper. However, further in accordance with my invention, I also provide such an apparatus with a plate of material that is a poor heat-conductor which is placed on top of the metallic base plate in the reaction vessel and covers the base plate entirely with respect to the antechamber. This liner plate preferably consists of quartz, as does the above-mentioned partition. However, a plate of other vitreous and quartz-like material or of heat-resistant glass or ceramic is also suitable. An example of such a suitable quartz-like material is silicon dioxide which has been sintered at a temperature below the melting point of quartz and has thus been converted into porous glass having enclosed air bubbles and exhibiting a low thermal conductance similar to that of quartz. A heat-resistant glass of comparably low heat conductance, produced by adding aluminum oxide and slight quantities of boron oxide to ordinary glass, is likewise well suited for the purpose of the invention. The liner plate is directly placed upon the base plate which consists of copper or silver for example, preferably having a thickness of approximately 6 mm. It has been found that when using such a liner plate the heat insulation is particularly effective and that, for example when producing hyperpure silicon by pyrolysis from silicochloroform, no oil of polymer explosive chlorsilane are formed in the reaction chamber. Due to their poor heat conductance, the liner plates effectively cause the retention of heat within the reaction space to such an extent that the vessel walls are maintained at a temperature between 160 and 400° C. Consequently, harmful oil formation as excluded by relatively simple means readily applicable in new as well as in already existing pyrolytic equipment.

The invention will be further described with reference to embodiments illustrated by way of example on the accompanying drawings in which:

FIG. 1 shows schematically and in vertical section an apparatus for producing rod-shaped semiconductor bodies; and FIG. 2 shows a modified portion of an apparatus otherwise similar to that of FIG. 1.

Reference in the following will be made to the production of hyperpure silicon, although the invention is analogously applicable in the production of germanium and other semiconductor materials. The illustrated reaction vessel according to FIG. 1 comprises a quartz bell 2 and a metallic base plate 1 consisting of copper or silver. The base plate is preferably cooled with circulating water by known means (not shown). Placed upon the base plate in accordance with the invention is a liner plate 19 of approximately 6 mm. thickness. The plate 19 consists of quartz or one of the other similarly suitable plate materials mentioned in the foregoing. The quartz bell 2 and a partitioning apron-like structure 3 also consisting of quartz are vacuum-tightly joined with the quartz plate 19 when the apparatus is in sealed and operating condition.

In the reaction space proper above the horizontal top of the partition 3, there is located a U-shaped carrier assembly consisting of two vertical silicon rods 6, 7 and a conducting bridge piece 8 preferably also consisting of silicon. The only other component of the apparatus protruding into the reaction space proper is an injection nozzle 4 that supplies the reaction gas mixture composed of a gaseous silicon compound, for example silicochloroform, and a carrier gas, preferably hydrogen. In the illustrated embodiment, the nozzle top is covered by a quartz cover 17, but the nozzle may also entirely consist of quartz.

The partition 3 separates an antechamber located adjacent to the base plate 1 from the reaction space. The current-supply conductors 11 and 12 for the two legs 6, 7 of the U-shaped carrier structure and the holders 9 and 10 for the respective legs are mounted in the antechamber. The holders 9 and 10 consist of carbon or low-ohmic silicon, or may consist of carbon coated with silicon. The conductors 11 and 12, copper rods for example, are insulated at 15 where they pass through the base plate 1 and are vacuum-tightly sealed at those locations and also where they pass through the quartz plate 19 placed upon the base plate. A pipe 5 for discharging the waste gases from the reaction chamber and a supply pipe 16 for passing hydrogen or argon into the reaction vessel extend through both the metallic base plate 1 and the quartz plate 19. The hydrogen or argon gas entering through pipe 16 passes about the ends of the carrier structure 6, 7, 8, more specifically where these ends pass through openings 13, 14 respectively in the partition 3, thus preventing the gaseous semiconductor compound from reaching these localities and being pyrolytically dissociated thereat. During the precipitation process, the conductors 11 and 12 are connected to a source of electric voltage so that the current passing through the silicon carrier rods 6 and 7 heats these rods to the pyrolytic dissociation temperature of the gaseous semiconductor compound.

The liner plate 19 of quartz placed face-to-face on top of the base plate 1 causes the heat to be retained within the reaction vessel and so effectively reduces the heat dissipation through the metal of the base plate and the associated metal structure that the walls of the reaction space do not cool below a temperature of 160° C. and consequently do not reach the formation temperature of the chlorsilane polymers. This has been found to be the case within the entire range of pyrolytic temperatures applied in the production of silicon, for example a rod temperature between 1050 and 1250° C. It also applies to the analogously lower temperatures relating to the production of germanium.

In the modified embodiment according to FIG. 2, the liner plate 19' of quartz placed upon the top of the base plate 1 has a slightly smaller diameter than that of the bell 2 so as to just fit into the opening of the partition structure 3. The bell and partition are gas-tightly joined with the base plate 1 and the apparatus is in sealed and operative condition.

The embodiments described have been found to be particularly favorable for the production of rod-shaped semiconductor bodies. If desired, however, the invention can also be incorporated in apparatus to which no hydrogen or argon for the purpose of cooling the carrier end locations and for keeping away the gaseous semiconductor compounds from these ends is supplied. Accordingly, if no such additional gas supply is needed, the pipe 16 and the pipe 5 may be omitted, and the waste gases from the reaction space may then be permitted to pass through the bores of the partition 3 that are traversed by the ends of rods 6, 7, to be exhausted from the antechamber in any suitable manner.

While my invention has been illustrated and described as an apparatus for the pyrolytic production of rod-shaped semiconductor bodies, it is not intended to be limited to the details shown, since various modifications in my method may be made without departing in any way from the spirit of the present invention. Such adaptations should and are intended to be comprehended within the meaning and range of equivalents of the following claims.

I claim:

1. Apparatus for producing rod-shaped semiconductor bodies of high purity by pyrolytically dissociating and precipitating the semiconductor substance from a gaseous compound thereof upon a heated carrier of the same material, comprising a vessel having a metallic base plate, a partition of vitreous material subdividing the interior of said vessel into an upper reaction space and a lower antechamber adjacent to said base palte and of smaller height than said reaction space, a structure of inverted U-shape forming the carrier located in said reaction space and having its two ends pass through said partition, current-supplying holder means for said respective ends of said structure and gas-duct means for supplying and discharging gas to and from said reaction space, said holder means and said gas-duct means extending through said base plate and being substantially contained in said antechamber, and a liner plate of heat-insulating inorganic material disposed face-to-face upon said base plate and substantially entirely covering it with respect to said antechamber.

2. Apparatus for producing rod-shaped semiconductor bodies of high purity by pyrolytically dissociating and precipitating the semiconductor substance from a gaseous compound thereof upon a heated carrier of the same material, comprising a vessel having a metallic base plate, a partition of quartz material horizontally subdividing the interior of said vessel into an upper reaction space and a lower antechamber adjacent to said base plate and of smaller height than said reaction space, the carrier being formed as a structure of inverted U-shape disposed in said reaction space and having its two ends pass through said partition, current-supplying holder means for said respective ends of said structure and gas-duct means for supplying and discharging gas to and from said reaction space, said holder means and said gas-duct means extending through said base plate and being substantially contained in said antechamber, and a heat-insulating liner plate of quartz directly placed upon said base plate and substantially entirely covering it with respect to said antechamber.

3. In pyrolytic semiconductor-production apparatus according to claim 1, said liner plate consisting of sintered silicon dioxide with dispersed air inclusions.

4. In pyrolytc semiconductor-production apparatus according to claim 1, said liner plate consisting of heat-resistant glass.

5. In pyrolytic semiconductor-production apparatus according to claim 1, said liner plate consisting of ceramic material.

6. In pyrolytic semiconductor-production apparatus according to claim 1, said liner plate having a thickness of about 6 mm.

References Cited

UNITED STATES PATENTS

| | | | |
|---|---|---|---|
| 1,439,410 | 12/1922 | Gray. | |
| 1,912,017 | 5/1933 | Slayter | 65—22 X |
| 2,119,259 | 5/1938 | Slayter | 65—22 |
| 2,828,225 | 3/1958 | Goetzel et al. | |
| 2,948,635 | 8/1960 | Koller | 117—106 |
| 3,011,877 | 12/1961 | Schweickert et al. | |
| 3,053,638 | 9/1962 | Reiser. | |
| 3,081,201 | 3/1963 | Koller | 118—49 X |
| 3,098,763 | 7/1963 | Deal et al. | 118—49.5 |
| 3,134,695 | 5/1964 | Henker et al. | 118—49.5 |
| 3,146,123 | 8/1964 | Bischoff | 118—48 X |

MORRIS KAPLAN, *Primary Examiner.*